United States Patent Office 3,178,466
Patented Apr. 13, 1965

3,178,466
2-(2,6-DIMETHOXYBENZOYLTHIO)ACETIC ACID
Wilbur Benedict McDowell, East Brunswick, and Wilbert Schmidt, Spotswood, N.J., assignors to Olin Mathieson Chemical Corporation, New York, N.Y., a corporation of Virginia
No Drawing. Filed July 17, 1962, Ser. No. 210,552
1 Claim. (Cl. 260—455)

This invention relates to an intermediate for use in the synthesis of a synthetic penicillin. More particularly the invention relates to 2-(2,6-dimethoxybenzoylthio)acetic acid.

2-(2,6-dimethoxybenzoylthio)acetic acid is produced by reacting 2,6-dimethoxybenzoyl chloride with thioglycollic acid in an organic solvent such as diglyme, diethyleneglycol, dimethyl ether or the like. It is useful for the production of dimethoxyphenyl penicillin (methicillin) by reaction with 6-aminopenicillanic acid.

The following example is illustrative of the invention.

EXAMPLE

*Preparation of 2-(2,6-dimethoxybenzoylthio)acetic acid*

15 ml. (0.21 m) of thioglycollic acid in 25 ml. of diglyme (diethyleneglycol dimethyl ether) are added over a period of 10 min. to 42 g. (0.21 m) of 2,6-dimethoxybenzoyl chloride in 50 ml. of diglyme with stirring. The temperature rises to 44° C. and HCl is evolved. The mixture is stirred for 1 hr. and the temperature drops to room temperature. It is then heated with stirring for about 1 hr. on the steam bath, cooled to room temperature and poured into 200 ml. of water. The oil which forms is separated from the aqueous layer. An additional 200 ml. of water are added to the aqueous layer and more oil is separated. The combined oil layers are washed with 200 ml. of water and the oil separated. The oil is taken up in ether (ca. 500 ml.) and dried over $MgSO_4$, filtered and evaporated to dryness on a flask evaporator to yield a residue of 44.3 grams. The residue is dissolved in 100 ml. of toluene with heating on the steam bath. The product crystallizes on storing at 5° C. This crude product melts at 103–115° C. On recrystallization from toluene the 2-(2,6-dimethoxybenzoylthio)acetic acid melts at 127.5–130.5° C.

What is claimed is:
2-(2,6-dimethoxybenzoylthio)acetic acid.

References Cited by the Examiner
UNITED STATES PATENTS

| | | | |
|---|---|---|---|
| 2,901,507 | 8/59 | Speeter et al. | 260—455 XR |
| 2,918,476 | 12/59 | Queen | 260—455 XR |
| 3,079,306 | 2/63 | Offe et al. | 260—239.1 XR |
| 3,093,537 | 6/63 | Tilles | 260—455 XR |
| 3,094,519 | 6/63 | Luttinger et al. | 260—239.1 |

OTHER REFERENCES
Chem. & Eng. News, Sept. 12, 1960, page 49.

CHARLES B. PARKER, *Primary Examiner.*
D. D. HORWITZ, *Examiner.*